(12) United States Patent
Takahashi et al.

(10) Patent No.: US 12,388,384 B2
(45) Date of Patent: Aug. 12, 2025

(54) SYNCHRONOUS MOTOR CONTROL DEVICE

(71) Applicant: Fanuc Corporation, Yamanashi (JP)

(72) Inventors: Kenji Takahashi, Yamanashi (JP); Tomohisa Tsutsumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 140 days.

(21) Appl. No.: 18/279,269

(22) PCT Filed: Mar. 22, 2022

(86) PCT No.: PCT/JP2022/013186
§ 371 (c)(1),
(2) Date: Aug. 29, 2023

(87) PCT Pub. No.: WO2022/202817
PCT Pub. Date: Sep. 29, 2022

(65) Prior Publication Data
US 2024/0154554 A1 May 9, 2024

(30) Foreign Application Priority Data

Mar. 26, 2021 (JP) .................. 2021-053495

(51) Int. Cl.
*H02P 21/00* (2016.01)
*H02P 21/18* (2016.01)
*H02P 21/22* (2016.01)

(52) U.S. Cl.
CPC .............. *H02P 21/18* (2016.02); *H02P 21/22* (2016.02)

(58) Field of Classification Search
CPC .................. H02P 21/18; H02P 21/22
(Continued)

(56) References Cited

U.S. PATENT DOCUMENTS 7,045,988 B2 * 5/2006 Ha .................. H02P 21/04
318/807
7,157,876 B2 * 1/2007 Ide .................. H02P 6/185
318/400.04
(Continued)

FOREIGN PATENT DOCUMENTS

JP 2006014423 A 1/2006
JP 2014023273 A 2/2014
(Continued)

OTHER PUBLICATIONS

International Search Report and Written Opinion for International Application No. PCT/JP2022/013186, dated May 31, 2022, 6 pages.

*Primary Examiner* — Erick D Glass
(74) *Attorney, Agent, or Firm* — Buchanan Ingersoll & Rooney PC

(57) ABSTRACT

A synchronous motor control device for controlling driving of a synchronous motor through sensorless control includes a DC excitation instruction generation unit that generates an instruction for supplying, to the synchronous motor, fixed excitation current having a current phase fixed; a torque zero equivalence detection unit that detects, on the basis of data relating to voltage or current control on the synchronous motor, a point of time at which torque generated in a rotor of the synchronous motor becomes equivalent to zero in a time period during which the excitation current based on the instruction is flowing through the synchronous motor; and a magnetic pole position update unit that initializes a magnetic pole position on the basis of the fixed current phase at the detected point of time at which the torque becomes equivalent to zero.

8 Claims, 11 Drawing Sheets

(58) Field of Classification Search
USPC .................................................. 318/400.02
See application file for complete search history.

(56) References Cited

U.S. PATENT DOCUMENTS

| | | | |
|---|---|---|---|
| 9,088,193 B2 | 7/2015 | Yamaguchi et al. | |
| 11,606,054 B2* | 3/2023 | Tseng | H02P 21/16 |
| 11,658,596 B2* | 5/2023 | Shibayama | F24F 11/30 |
| | | | 318/400.01 |
| 2023/0109908 A1 | 4/2023 | Takahashi et al. | |

FOREIGN PATENT DOCUMENTS

| | | |
|---|---|---|
| JP | 2017221001 A | 12/2017 |
| JP | 2020065433 A | 4/2020 |
| WO | 2021172275 A1 | 9/2021 |

\* cited by examiner

SYNCHRONOUS MOTOR CONTROL DEVICE

CROSS REFERENCE TO RELATED APPLICATIONS

This is the U.S. National Phase application of PCT/JP2022/013186, filed Mar. 22, 2022, which claims priority to Japanese Patent Application No. 2021-053495, filed Mar. 26, 2021, the disclosures of each of these applications being incorporated herein by reference in their entireties for all purposes.

FIELD OF THE INVENTION

The present invention relates to a synchronous motor control device.

BACKGROUND OF THE INVENTION

In a synchronous motor, a current is caused to flow through an appropriate phase winding in accordance with a magnetic pole position of a rotor by using a dq-coordinate control system, and a desired torque is generated. In such a synchronous motor, a magnetic pole initial position needs to be detected in order to perform appropriate control of the rotor. As a technique for detecting the magnetic pole initial position in the synchronous motor, a magnetic pole initial position detection method using direct-current excitation is known. In the magnetic pole initial position detection method using direct-current excitation, a constant excitation current with a fixed current phase is continuously caused to flow through the synchronous motor, and, after the rotor finally stops, a magnetic pole position is initialized by the current phase.

The synchronous motor includes a synchronous motor including a position detection sensor for detecting a magnetic pole position of a rotor, and a synchronous motor without including a position detection sensor. PTL 1 describes a magnetic pole initial position detection device that detects, in a synchronous motor including a position detection sensor that detects a rotor position, a point in time at which a torque generated in a rotor is zero by detecting, from an output of the position detection sensor, a point in time at which a polarity of an acceleration of the rotor changes while a constant excitation current using direct-current excitation is continuously caused to flow through the synchronous motor, and that acquires a magnetic pole initial position, based on a rotor actual position at this point in time (for example, see a paragraph [0047]).

PTL 2 describes a "method for estimating an initial magnetic pole position of a brushless motor being processed in a procedure of observing, in a θy·θs creation circuit, an interference current generated in a δ-axis direction when a γ-axis current command from a γ-axis current generation circuit is given as an alternating current command having a step shape, storing the interference current, and predetermining a magnetic pole position estimation start phase Os by a relationship of magnitude of the interference current stored in such a manner" (abstract).

PTL 3 describes, as a synchronous electric motor control device that performs sensorless control, a device "including a feedback current detection unit that detects, as a feedback current Ir, a current of any one phase being selected by a phase selection signal s and flowing through a PM motor 1, a phase voltage command computing unit that computes a phase voltage command value V*, based on a phase current command value I* and a feedback current Ifb, a three-phase command computing unit that computes a three-phase voltage command value setting the phase selected by the phase selection signal s as the phase voltage command value V*, and an initial phase selection unit that outputs an initial phase 00 set in accordance with the phase selection signal" (abstract).

PATENT LITERATURE

[PTL 1] Japanese Unexamined Patent Publication (Kokai) No. 2020-065433 A
[PTL 2] Japanese Unexamined Patent Publication (Kokai) No. 2006-014423 A
[PTL 3] Japanese Unexamined Patent Publication (Kokai) No. 2017-221001 A

SUMMARY OF THE INVENTION

As described in PTL 1, in a case of a motor control device that can use a position detection sensor, when a constant excitation current using direct-current excitation flows, a rotor speed, an acceleration, and the like are calculated from a signal of a position detection sensor, and a point in time corresponding to zero torque is detected, and thus a configuration that can detect a magnetic pole initial position in a short time can be achieved. However, in a case of sensorless control in which a signal of a position detection sensor cannot be used, zero torque (zero acceleration or a speed extreme value) cannot be directly detected as in a case where a signal of the position detection sensor is used. A motor control device that can detect a magnetic pole initial position in a short time while being a motor control device that performs sensorless control without including a magnetic pole position sensor is desired.

One aspect of the present disclosure is a synchronous motor control device that performs drive control by sensorless control on a synchronous motor. The synchronous motor control device includes a direct-current excitation command generation unit configured to generate a command for causing a constant excitation current with a fixed current phase to flow through the synchronous motor, a zero torque correspondence detection unit configured to detect a point in time at which a torque generated in a rotor of the synchronous motor corresponds to zero, based on data about voltage or current control on the synchronous motor when the excitation current based on the command flows through the synchronous motor; and a magnetic pole position update unit configured to initialize a magnetic pole position at the detected point in time at which the torque corresponds to zero, based on the fixed current phase.

According to the configuration described above, a motor control device that performs sensorless control without including a position detection sensor in a motor can also detect a point in time corresponding to zero torque, and can perform detection of a magnetic pole initial value by a direct-current excitation method in a short time.

The objects, features, and advantages, and other objects, features, and advantages of the present invention will become more apparent from detailed description of a typical embodiment of the present invention illustrated in accompanying drawings.

DETAILED DESCRIPTION OF EMBODIMENTS OF THE INVENTION

Figure 1:
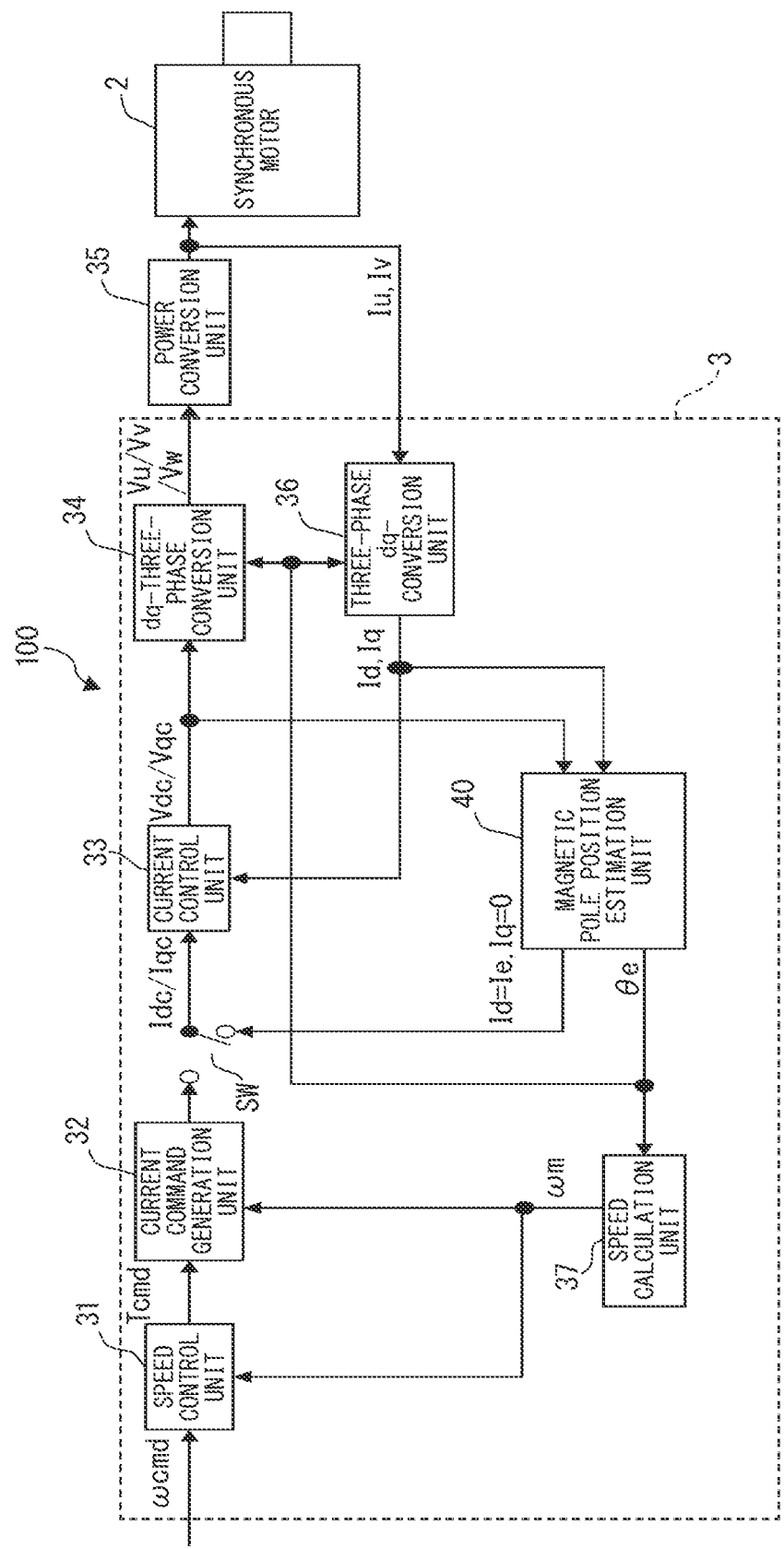
FIG. 1 is a block diagram illustrating a motor control device according to an embodiment.

Hereinafter, embodiments of the present disclosure will be described with reference to drawings. In referenced drawings, similar components or functional parts are given similar signs. In order to facilitate understanding, the drawings use different scales as appropriate. Further, embodiments illustrated in the drawings are an example for implementing the present invention, and the present invention is not limited to the illustrated embodiments.

FIG. 1 is a block diagram illustrating a configuration of a synchronous motor control device 100 (hereinafter described as a motor control device 100) according to an embodiment. The motor control device 100 is a control device that performs drive control, i.e., sensorless control on a synchronous motor 2 that does not include a position detection sensor. The motor control device 100 receives a speed command $\omega_{cmd}$ from a host control device, generates an appropriate torque in the synchronous motor 2, and performs the drive control.

In order to appropriately control the synchronous motor 2, a position, i.e., a magnetic pole position of a rotor of the synchronous motor 2 needs to be recognized in the motor control device 100. The motor control device 100 is configured to detect a magnetic pole initial position by using data about voltage or current control prior to execution of sensorless control to which the speed command $\omega_{cmd}$ is applied. When the magnetic pole initial position is detected, the motor control device 100 shifts to normal sensorless control to which the speed command co c md is applied.

As illustrated in FIG. 1, the motor control device 100 includes a speed control unit 31, a current command generation unit 32, a current control unit 33, a dq-three-phase conversion unit 34, a power conversion unit 35, a three-phase dq-conversion unit 36, a speed calculation unit 37, and a magnetic pole position estimation unit 40.

The speed control unit 31 generates a torque command $T_{cmd}$, based on the speed command $\omega_{cmd}$ and a speed $\omega_m$ of the rotor of the synchronous motor 2 acquired by the speed calculation unit 37.

The current command generation unit 32 generates a d-axis current command $I_{dc}$ and a q-axis current command $I_{qc}$, based on the torque command $T_{cmd}$ and the speed $\omega_m$ of the rotor of the synchronous motor 2 acquired by the speed calculation unit 37.

The three-phase dq-conversion unit 36 performs three-phase dq conversion on three-phase currents $I_u$, $I_v$, and $I_w$ output from the power conversion unit 35, based on a magnetic pole position (θe) detected by the magnetic pole position estimation unit 40, and outputs a d-axis current $I_d$ and a q-axis current $I_q$ to the current control unit 33. Note that the three-phase dq-conversion unit 36 acquires a W-phase current $(I_w)$ from a U-phase current $(I_u)$ and a V-phase current $(I_v)$, based on a relationship among the three-phase currents $I_u$, $I_v$, and $I_w$.

During drive control of the synchronous motor 2 by the normal sensorless control, a switch SW is connected to the current command generation unit 32 side, and a current command from the current command generation unit 32 is input to the current control unit 33. On the other hand, during magnetic pole initial position detection, the switch SW is connected to the magnetic pole position estimation unit 40 side, and a direct-current excitation command from the magnetic pole position estimation unit 40 is input to the current control unit 33.

During the normal motor control, the current control unit 33 generates a d-axis voltage command $V_{dc}$ and a q-axis voltage command $V_{qc}$, based on the d-axis current command $I_{dc}$ and the q-axis current command $I_{qc}$, and the d-axis current $I_d$ and the q-axis current $I_q$. Further, during the magnetic pole initial position detection, the current control unit 33 generates the d-axis voltage command $V_{dc}$ and the q-axis voltage command $V_{qc}$ for flowing a constant excitation current with a fixed current phase, based on a direct-current excitation command ($I_d=I_e$, $I_q=0$) output from the magnetic pole position estimation unit 40. Note that, during execution of the direct-current excitation, the current control unit 33 also performs control by the d-axis current $I_d$ and the q-axis current $I_q$ fed back from the three-phase dq-conversion unit 36.

The dq-three-phase conversion unit 34 performs dq-three-phase conversion on the d-axis voltage command $V_{dc}$ and the q-axis voltage command $V_{qc}$, based on the magnetic pole position (θe) detected by the magnetic pole position estimation unit 40, and outputs three-phase voltage commands $V_{uc}$, $V_{vc}$, and $V_{wc}$ to the power conversion unit 35.

The power conversion unit 35 is formed of, for example, a reverse converter (three-phase inverter) formed of a full-bridge circuit of a semiconductor switching element, and outputs the three-phase currents $I_u$, $I_v$, and $I_w$ for controlling ON/OFF of the semiconductor switching element and driving the synchronous motor 2, based on the received three-phase voltage commands $V_{uc}$, $V_{vc}$, and $V_{wc}$.

In the configuration in FIG. 1, the speed control unit 31, the current command generation unit 32, the current control unit 33, the dq-three-phase conversion unit 34, the three-phase dq-conversion unit 36, the speed calculation unit 37, and the magnetic pole position estimation unit 40 may be achieved by a microcontroller 3 in which a CPU core, a memory, an interface function with external equipment, and the like are integrated. In other words, in this case, the speed control unit 31, the current command generation unit 32, the current control unit 33, the dq-three-phase conversion unit 34, the three-phase dq-conversion unit 36, the speed calculation unit 37, and the magnetic pole position estimation unit 40 can be achieved as a function of software executed under control of the CPU of the microcontroller 3. Alternatively, each of the functional blocks may be achieved by a configuration in which hardware such as an application specific integrated circuit (ASIC) is main.

In the configuration described above, during a magnetic pole initial position detection operation, the magnetic pole position estimation unit 40 acquires a magnetic pole initial position, based on data about voltage or current control when a constant excitation current with a fixed current phase is continuously caused to flow through the synchronous motor 2. The magnetic pole position estimation unit 40 continuously outputs the magnetic pole position (θe) by initializing a magnetic pole position counter by the acquired magnetic pole initial position, and subsequently updating the magnetic pole position counter by magnetic pole position information (hereinafter, such information will be also described as an electrical angle feedback) estimated by sensorless control. The speed calculation unit 37 calculates a rotor speed by, for example, multiplying a change amount (Δθe) of the magnetic pole position by a speed conversion coefficient, based on a signal of the magnetic pole position (θe). Details of the function of the magnetic pole position estimation unit 40 will be described below.

Figure 2A:
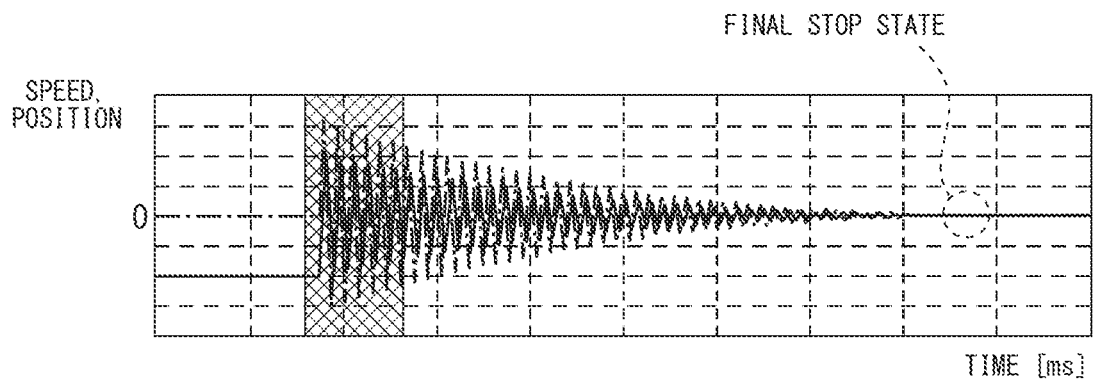
FIG. 2A is a diagram illustrating behavior of a rotor of a synchronous motor when a constant excitation current with a fixed current phase is continuously caused to flow through the synchronous motor.
Figure 2B:
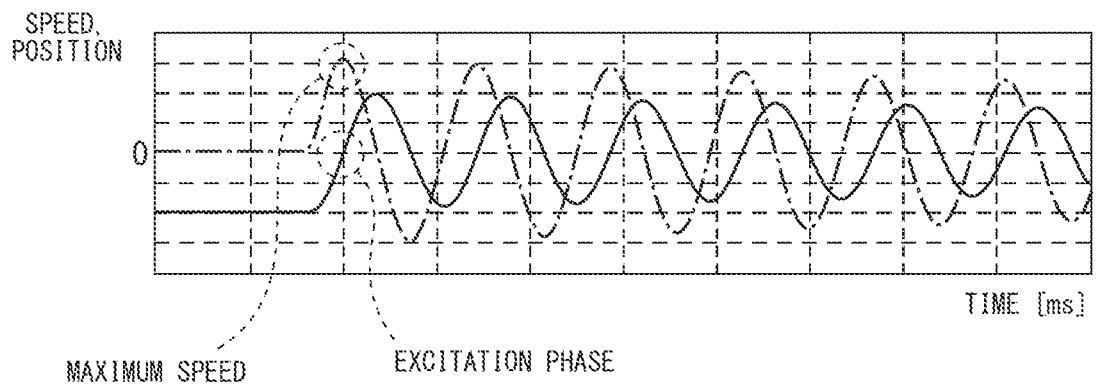
FIG. 2B is an enlarged diagram of FIG. 2A in a time axis direction.

FIGS. 2A to 2B are diagrams illustrating behavior of the rotor of the synchronous motor 2 when a constant excitation current with a fixed current phase is continuously caused to flow through the synchronous motor 2, FIG. 2A is a diagram illustrating a speed and a position of the rotor with a lapse of time, and FIG. 2B is an enlarged diagram of FIG. 2A in a time axis direction. In FIGS. 2A and 2B, a solid line indicates a rotor actual position of the synchronous motor 2 with a lapse of time, and a dot-and-dash line indicates a speed (rotational angular speed) of the synchronous motor 2. When a constant excitation current with a fixed current phase is continuously caused to flow through the synchronous motor 2, the rotor of the synchronous motor 2 oscillates in a rotational direction as illustrated in FIGS. 2A to 2B. The oscillation of the synchronous motor 2 gradually attenuates, and the rotor finally stops.

Figure 3:
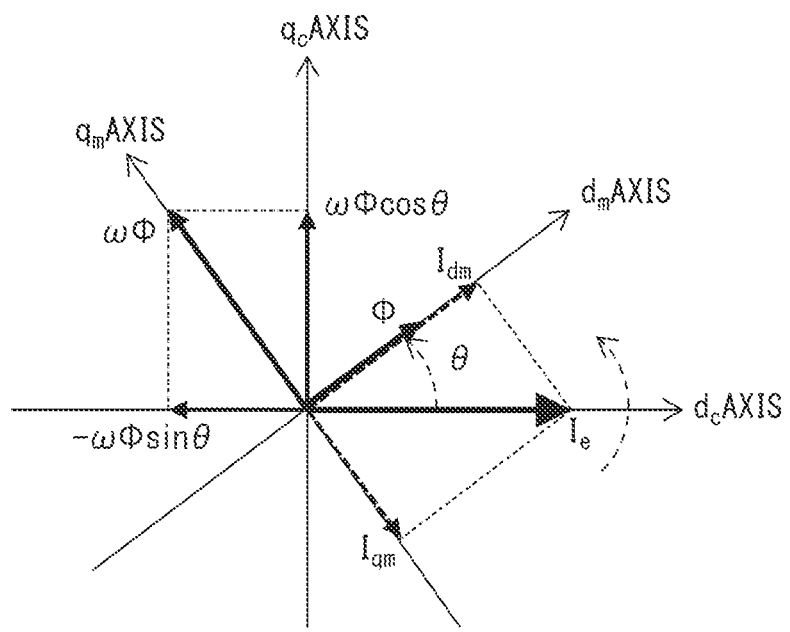
FIG. 3 is a diagram illustrating a relationship between a dq-coordinate system according to the synchronous motor and a dq-coordinate system according to the motor control device that controls the synchronous motor.

FIG. 3 is a diagram illustrating a relationship between a dq-coordinate system according to the synchronous motor and a dq-coordinate system according to the motor control device that controls the synchronous motor. Coordinate axes of the dq-coordinate system according to the synchronous motor are denoted by $d_m$ and $q_m$, and coordinate axes of the dq-coordinate system according to the motor control device that controls the synchronous motor are denoted by $d_c$ and $q_c$. Further, a deviation amount of the d-axis between the coordinate systems (i.e., an angle formed between the coordinate axis $d_m$ and the coordinate axis $d_c$) is denoted by θ.

Note that the deviation amount θ is also a deviation amount of the q-axis between the coordinate systems (i.e., an angle formed between the coordinate axis $q_m$ and the coordinate axis $q_c$).

A constant excitation current with a current phase fixed at 0 degrees in the dq-coordinate system according to the motor control device is denoted by $I_e$. At this time, in the dq-coordinate system according to the synchronous motor, the excitation current $I_e$ is expressed as an equation (1).

[Math 1]

$I_{dm} = I_e \cdot \cos θ$ $I_{qm} = -I_e \cdot \sin θ$ \hspace{2em} (1)

When the number of pole pairs of the synchronous motor 2 is denoted by pp, a main magnetic flux is denoted by Φ, a d-phase inductance is denoted by $L_d$, and a q-phase inductance is denoted by $L_q$, a torque $T_r$ generated when the excitation current $I_e$ flows through the synchronous motor having a salient pole is expressed as an equation (2).

[Math 2]

$$\begin{aligned} T_r &= pp \cdot \{Φ - (L_q - L_d) \cdot I_{dm}\} \cdot I_{qm} \\ &= pp \cdot \{Φ - (L_q - L_d) \cdot I_e \cdot \cosθ\} \cdot (-I_e \cdot \sinθ) \end{aligned} \hspace{2em} (2)$$

Further, the d-phase inductance $L_d$ and the q-phase inductance $L_q$ are equal to each other in a non-salient-pole synchronous motor (i.e., a synchronous motor that does not have a salient pole). Therefore, the torque $T_r$ generated when the excitation current $I_e$ flows through the non-salient-pole synchronous motor is expressed as an equation (3) by transforming the equation (2).

[Math 3]

$T_r = pp \cdot Φ \cdot (-I_e \cdot \sin θ)$ \hspace{2em} (3)

When a constant excitation current with a fixed current phase is continuously caused to flow through the synchronous motor, the rotor of the synchronous motor oscillates in the rotational direction, and the oscillation gradually attenuates and finally stops as illustrated in FIGS. 2A to 2B. When the rotor of the synchronous motor is located in a final stop position, the stop position of the rotor matches an excitation phase, and the deviation amount θ between the coordinate systems is zero. While the excitation current is continuously caused to flow through the synchronous motor and the rotor oscillates in the rotational direction, the deviation amount θ changes with time. The equations (2) and (3) include "sin θ", and when the deviation amount θ is zero, "sin θ" is zero, and accordingly the torque $T_r$ is zero. Conversely, when the torque $T_r$ is zero, "sin θ" in the equations (2) and (3) may be zero, i.e., the deviation amount θ may be zero. Thus, a point in time at which the torque $T_r$ corresponds to zero while a constant excitation current with a fixed current phase is continuously caused to flow through the synchronous motor is detected, and a magnetic pole position can be initialized by a current phase (excitation phase) at this detection point in time.

However, in a case of the synchronous motor having the salient pole, "$\{Φ - (L_q - L_d) \cdot I_e \cdot \cos θ\}$" in the equation (2) may be zero, i.e., the torque $T_r$ expressed in the equation (2) may be zero when θ has a value other than zero depending on magnitude of the excitation current $I_e$. In other words, in the case of the synchronous motor having the salient pole, the deviation amount θ is not necessarily zero even when the torque $T_r$ is zero. Therefore, when the present embodiment is applied to the synchronous motor having the salient pole, it is necessary to cause the excitation current $I_e$ that sets "$\{\Phi-(L_q-L_d)\cdot I_e\cdot\cos\theta\}$" to zero not to flow. On the other hand, in a case of the non-salient-pole synchronous motor, the deviation amount θ is expressed in the equation (3), and thus the torque $T_r$ is zero only when the deviation amount θ is zero. Accordingly, when the present embodiment is applied to the non-salient-pole synchronous motor, an upper limit value does not need to be provided to the constant excitation current $I_e$ with a fixed current phase.

Herein, magnitude of the excitation current $I_e$ flowing in order to acquire a magnetic pole initial position of the synchronous motor having the salient pole will be described with reference to FIGS. 4A to 4B and 5.

Figure 4A:
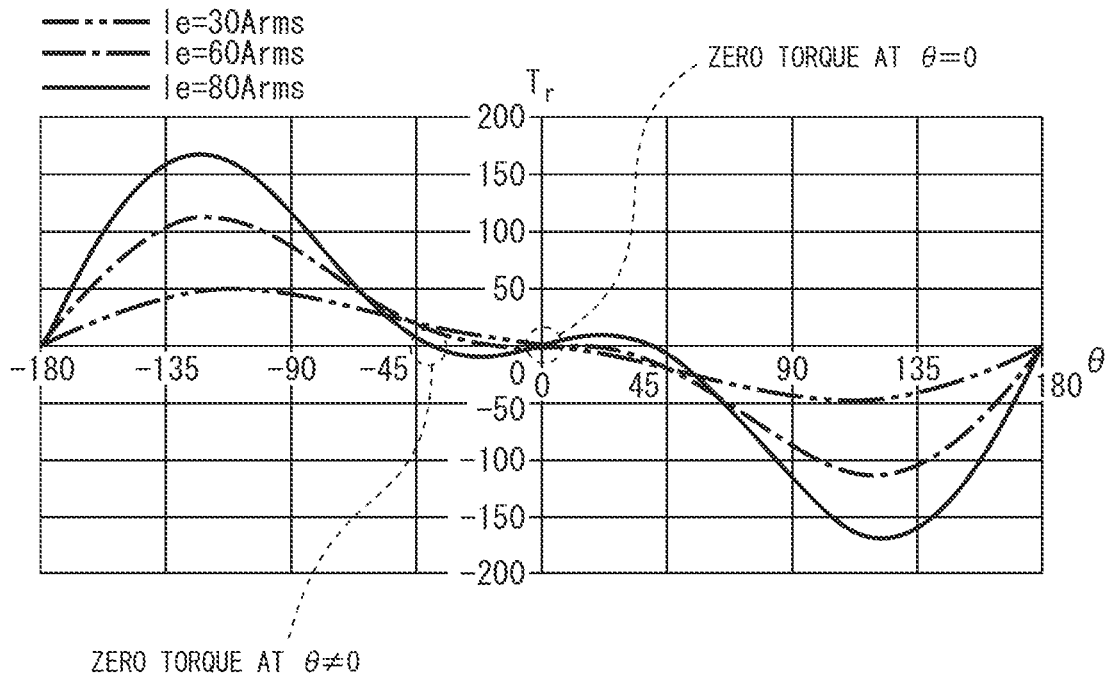
FIG. 4A is a diagram illustrating magnitude of an excitation current flowing in order to acquire a magnetic pole initial position of a synchronous motor having a salient pole, and a horizontal axis indicates a deviation amount θ, and a vertical axis indicates a torque $T_r$.
Figure 4B:
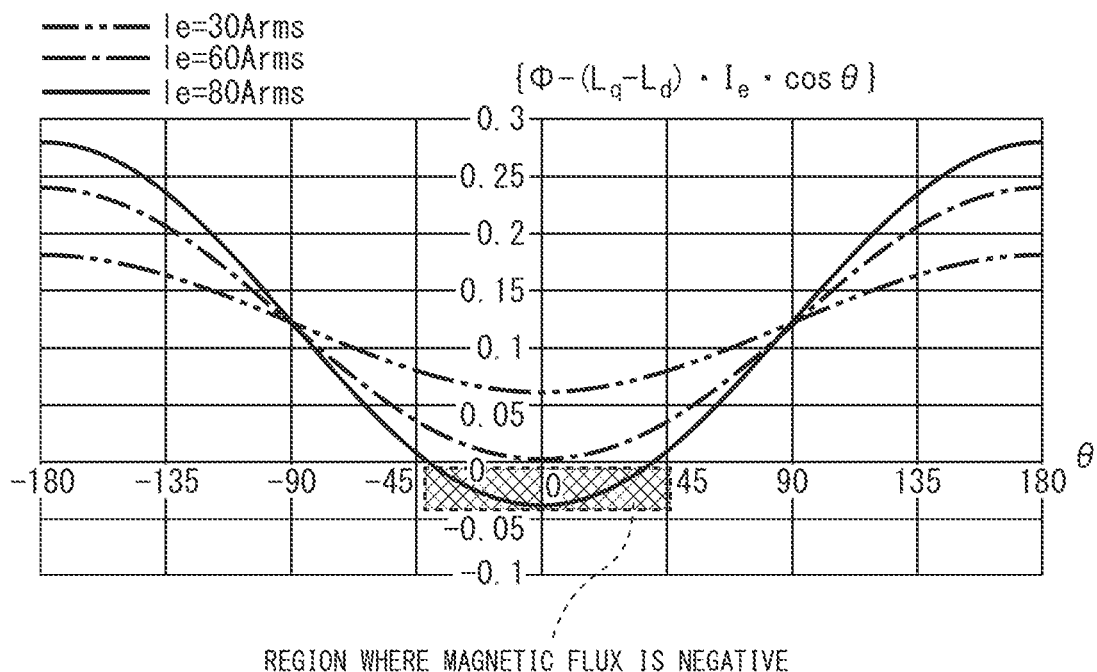
FIG. 4B is a diagram illustrating magnitude of an excitation current flowing in order to acquire a magnetic pole initial position of the synchronous motor having the salient pole, and a horizontal axis indicates the deviation amount θ, and a vertical axis indicates a value obtained by dividing an equation of a generated torque by a Q-phase current.

FIGS. 4A and 4B are diagrams illustrating magnitude of an excitation current flowing in order to acquire a magnetic pole initial position of the synchronous motor having the salient pole. In FIG. 4A, a horizontal axis indicates the deviation amount θ, and a vertical axis indicates the torque $T_r$. In FIG. 4B, a horizontal axis indicates the deviation amount θ, and a vertical axis indicates a value obtained by dividing an equation of a generated torque by a Q-phase current. Further, in FIGS. 4A and 4B, a chain double-dashed line indicates a case where the excitation current $I_e$ is 30 Arms, a dot-and-dash line indicates a case where the excitation current $I_e$ is 60 Arms, and a solid line indicates a case where the excitation current $I_e$ is 80 Arms. Note that magnitude of the excitation current $I_e$ illustrated in FIGS. 4A and 4B is merely an example.

In a case where the excitation current $I_e$ is 30 Arms or 60 Arms, the torque $T_r$ is zero only when the deviation amount θ is zero as illustrated in FIG. 4A. In contrast, in a case where the excitation current $I_e$ is 80 Arms, the torque $T_r$ is zero not only when the deviation amount θ is zero, but also when the deviation amount θ is at or near "−44 degrees". The reason for the occurrence of such a situation where the torque $T_r$ is zero also when the deviation amount θ has a value other than zero in a case where the excitation current $I_e$ is 80 Arms is that the value obtained by dividing the equation of the generated torque by the Q-phase current has a negative region as illustrated in FIG. 4B. Thus, when the present embodiment is applied to the synchronous motor having the salient pole, the excitation current $I_e$ needs to be set in such a way that the torque $T_r$ expressed in the equation (2) is positive (i.e., greater than zero) in all cases where the deviation amount θ is not zero. The details are as follows.

An inequality (4) is acquired by applying "$T_r>0$" and "$\theta\neq 0$" to the equation 2 and by transforming the equation (2).

[Math 4]

$$\Phi-(L_q-L_d)\cdot I_e\cdot\cos\theta>0 \tag{4}$$

Since "$-1\leq\cos\theta\leq 1$" holds true in the inequality (4), an inequality (5) is acquired from the inequality (4).

[Math 5]

$$\Phi-(L_q-L_d)\cdot I_e>0 \tag{5}$$

An inequality (6) is acquired by transforming the inequality (5).

[Math 6]

$$I_e < \frac{\Phi}{L_q - L_d} \tag{6}$$

Thus, when the present embodiment is applied to the synchronous motor having the salient pole, the constant excitation current $I_e$ with a fixed current phase may be set to magnitude that satisfies the inequality (6). In the present embodiment, when the synchronous motor in which the magnetic pole initial position needs to be acquired is the synchronous motor having the salient pole, the magnetic pole position estimation unit 40 generates a command in such a way that the excitation current $I_e$ lower than an upper limit value "$\Phi/(L_q-L_d)$" flows through the synchronous motor 2.

Note that the main magnetic flux Φ decreases as a temperature of a permanent magnet provided in the synchronous motor 2 rises. Thus, an upper limit value of the excitation current $I_e$ may be set in consideration of a temperature rise in the permanent magnet assumed during driving of the synchronous motor 2 having the salient pole. Herein, magnitude of the excitation current $I_e$ flowing in order to acquire a magnetic pole initial position in consideration of a temperature rise in the permanent magnet of the synchronous motor having the salient pole will be described with reference to FIG. 5.

Figure 5:
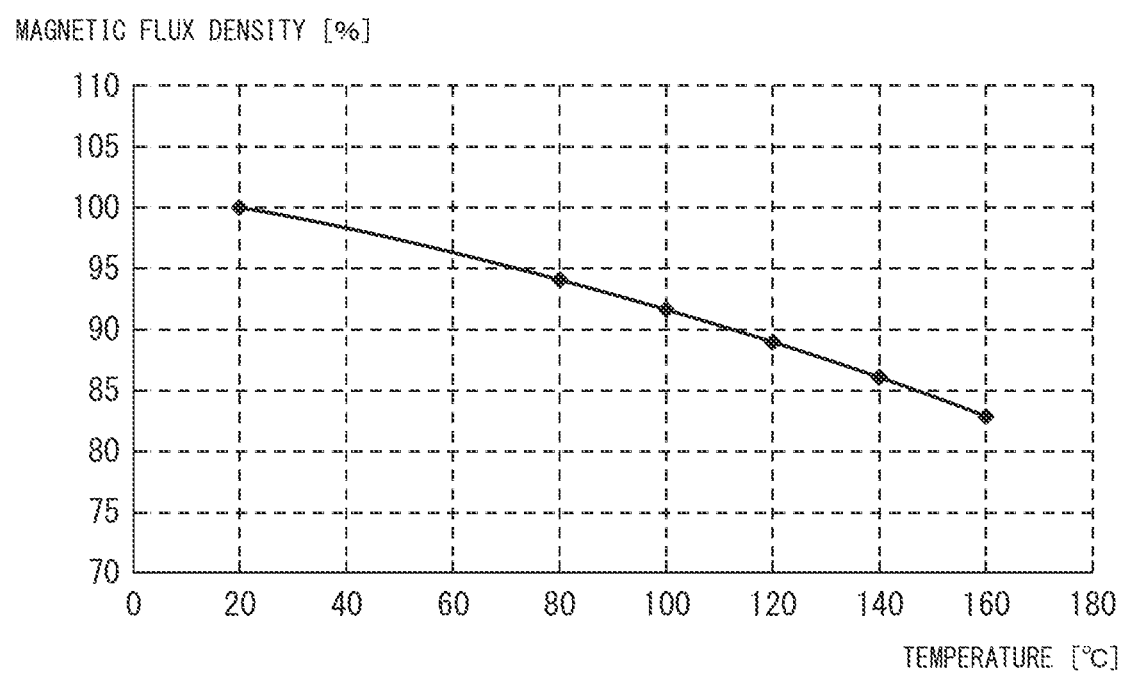
FIG. 5 is a diagram illustrating a relationship between a temperature of a permanent magnet provided in the synchronous motor and a magnetic flux density of a main magnetic flux of the synchronous motor.

FIG. 5 is a diagram illustrating a relationship between a temperature of the permanent magnet provided in the synchronous motor and a magnetic flux density of a main magnetic flux of the synchronous motor. In FIG. 5, a horizontal axis indicates a temperature of the permanent magnet provided in the synchronous motor 2, and a vertical axis indicates a ratio of the magnetic flux density when the magnetic flux density of the permanent magnet at 20° C. is defined as 100%. Note that numerical values illustrated in FIG. 5 are merely examples and may be set to other numerical values. For example, in a case where a maximum temperature of the permanent magnet assumed during driving of the synchronous motor 2 having the salient pole is 160 degrees, the excitation current $I_e$ is limited in consideration of a magnetic flux $\Phi_{min}$ (smallest magnetic flux density) at the assumed maximum temperature of the permanent magnet of the synchronous motor 2 in such a way that the generated torque is not zero at the deviation amount θ other than zero even when the permanent magnet is at 160 degrees. In other words, an inequality (7) can be acquired from the inequality (6).

[Math 7]

$$I_e < \frac{\Phi_{min}}{L_q - L_d} \tag{7}$$

Thus, when the present embodiment is applied to the synchronous motor having the salient pole, the constant excitation current $I_e$ with a fixed current phase may be set to magnitude that satisfies the inequality (7) in consideration of the temperature rise in the permanent magnet assumed during driving of the synchronous motor. In this case, the magnetic pole position estimation unit 40 generates a command in such a way that the excitation current $I_e$ lower than an upper limit value "$\Phi_{min}/(L_q-L_d)$" flows through the synchronous motor 2.

Figure 6:
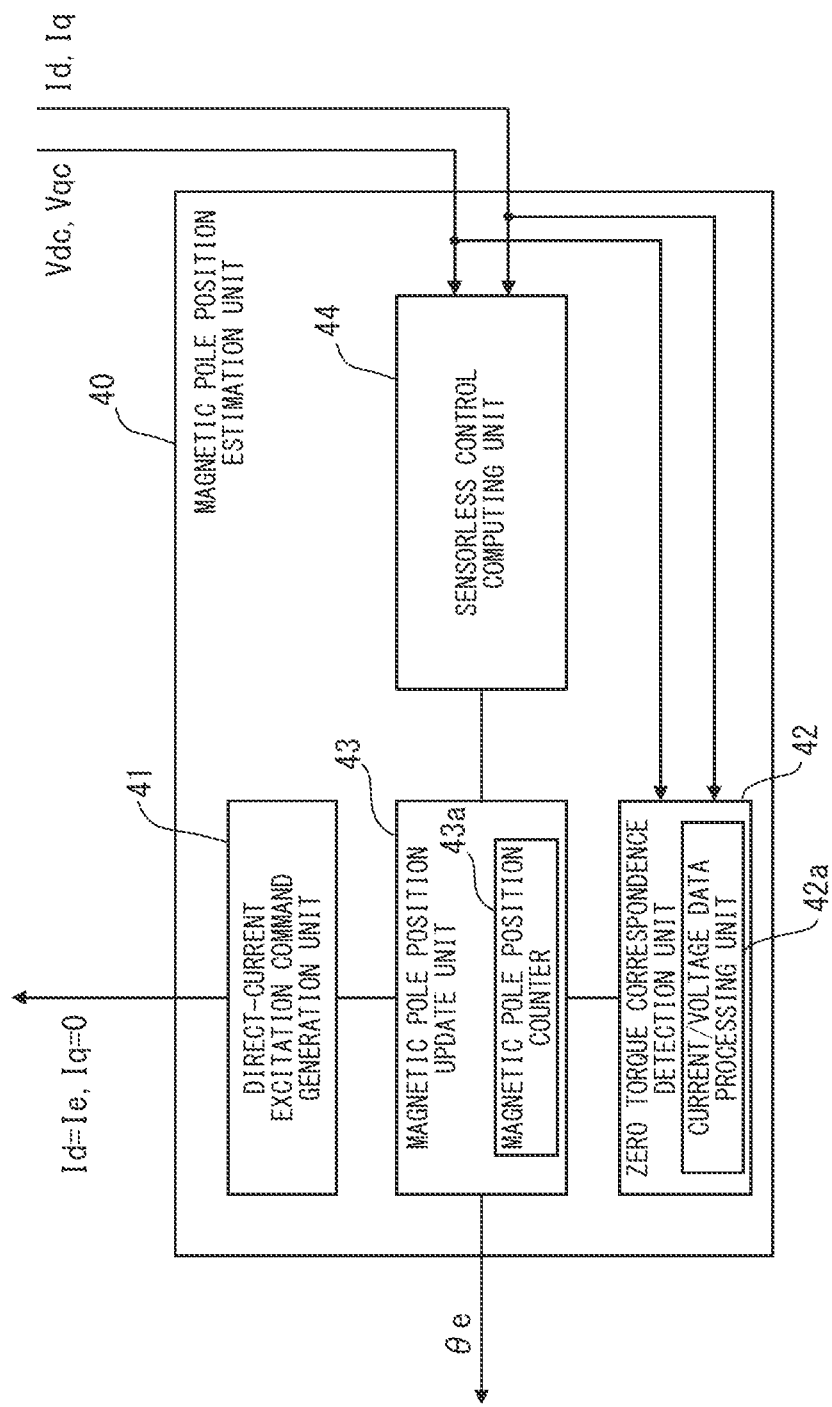
FIG. 6 is a functional block diagram of an excitation position estimation unit in the motor control device.

FIG. 6 is a functional block diagram of the magnetic pole position estimation unit 40. As illustrated in FIG. 6, the magnetic pole position estimation unit 40 includes a direct-current excitation command generation unit 41, a zero torque correspondence detection unit 42, a magnetic pole position update unit 43, and a sensorless control computing unit 44 that performs an estimation computation in normal sensorless control. The direct-current excitation command generation unit 41 generates a command for causing a constant excitation current with a current phase fixed to a predetermined phase (in the present embodiment, $I_d=I_e$, $I_q=0$) to flow through the synchronous motor 2. The command generated by the direct-current excitation command generation unit 41 is sent to the current control unit 33 in the motor control device 100 for controlling driving of the synchronous motor 2. The current control unit 33 generates a voltage command, based on the current command received from the direct-current excitation command generation unit 41 and the current feedback ($I_d$, $I_q$) converted in the fixed current phase, and the power conversion unit 35 generates a constant excitation current with a fixed current phase by applying a drive voltage to the synchronous motor 2, based on the received voltage command. With this excitation current as a drive source, the synchronous motor 2 starts to be attracted to a phase position of an excitation phase.

The zero torque correspondence detection unit 42 detects a point in time at which a torque applied to the rotor corresponds to zero by processing data about voltage or current control while a constant excitation current with a fixed current phase flows through the synchronous motor 2. The zero torque correspondence detection unit 42 includes a current/voltage data processing unit 42a, and the current/voltage data processing unit 42a processes the data about the voltage or current control, and detects the point in time at which the torque corresponds to zero.

When the zero torque correspondence detection unit 42 detects a point in time at which a torque corresponds to zero, the magnetic pole position update unit 43 initializes a magnetic pole position counter 43a by regarding a current phase (i.e., an excitation phase) at that point in time as a magnetic pole phase. In this way, a magnetic pole initial position of the rotor is detected. When the magnetic pole initial position is detected in such a manner, the motor control device 100 shifts to an operation of normal sensorless control to which a speed command is applied. During the normal operation by the sensorless control, a computation for acquiring a rotor position or a speed is performed by a predetermined algorithm in the sensorless control computing unit 44. During the normal operation, the magnetic pole position update unit 43 continues an operation of updating the magnetic pole position counter 43a by rotor position information (electrical angle feedback) acquired from the sensorless control computing unit 44, and outputting the magnetic pole position (θe).

Note that, as an estimation method (an estimation computation algorithm performed by the sensorless control computing unit 44) of a rotor position and the like by a sensorless control method during a normal operation, various techniques such as a method for using a voltage of a speed electromotive force induced in a motor wiring and a method for using rotor position dependence of a wiring inductance value are known in the field, and the various techniques known in the field can be applied as the sensorless control method to the present embodiment.

As a function of detecting a point in time at which a torque applied to the rotor in direct-current excitation corresponds to zero, the zero torque correspondence detection unit 42 has a function of detecting the point in time at which the torque corresponds to zero, based on current data, and a function of detecting the point in time at which the torque corresponds to zero, based on a voltage command data. Specifically, the zero torque correspondence detection unit 42 is configured to be able to detect the point in time at which the torque corresponds to zero by (1) to (4) indicated below. The zero torque correspondence detection unit 42 can detect the torque corresponding to zero by any of the following functions (A1) to (A4).

(A1) A function of detecting a phase of a torque corresponding to zero by using a Q-phase current.
(A2) A function of detecting a phase of a torque corresponding to zero by using a D-phase current.
(A3) A function of detecting a phase of a torque corresponding to zero by using a D-phase voltage command.
(A4) A function of detecting a phase of a torque corresponding to zero by using a Q-phase voltage command.

Each of the functions (A1) to (A4) described above for detecting a point in time at which a torque corresponds to zero will be described below.

(A1) The function of detecting a phase of a torque corresponding to zero by using a Q-phase current.

When a non-salient-pole electric motor is assumed as described above, a torque (Tr) is expressed by an equation below.

$$T_r = k \cdot \Phi \cdot I_q$$

where
k: Proportionality constant,
Φ: Main magnetic flux, and
$I_q$: Q-phase current.

Thus, a polarity of the generated torque (Tr) changes when the Q-phase current $I_q$ during excitation is zero-crossed. This time is a point in time at which a torque is zero. However, current control by the current control unit 33 is also performed during magnetic pole detection, and thus a change of the Q-phase current $I_q$ is small, and it is conceivable that direct detection of a zero-cross is likely to cause false detection. Thus, when it is considered that the Q-phase current $I_q$ corresponding to a torque corresponds to an acceleration and that an integrated Q-phase current value acquired by integrating the Q-phase current $I_q$ corresponds to a speed, detection of an extreme value (a local maximum value, a local minimum value) of the integrated Q-phase current value corresponds to detection of zero torque. Note that a polarity of the Q-phase current detected at this time and a polarity of an actual torque are opposite to each other, and thus, in order to set the same polarity, the integrated Q-phase current value is acquired by $\Sigma(-I_q)$.

Figure 7:
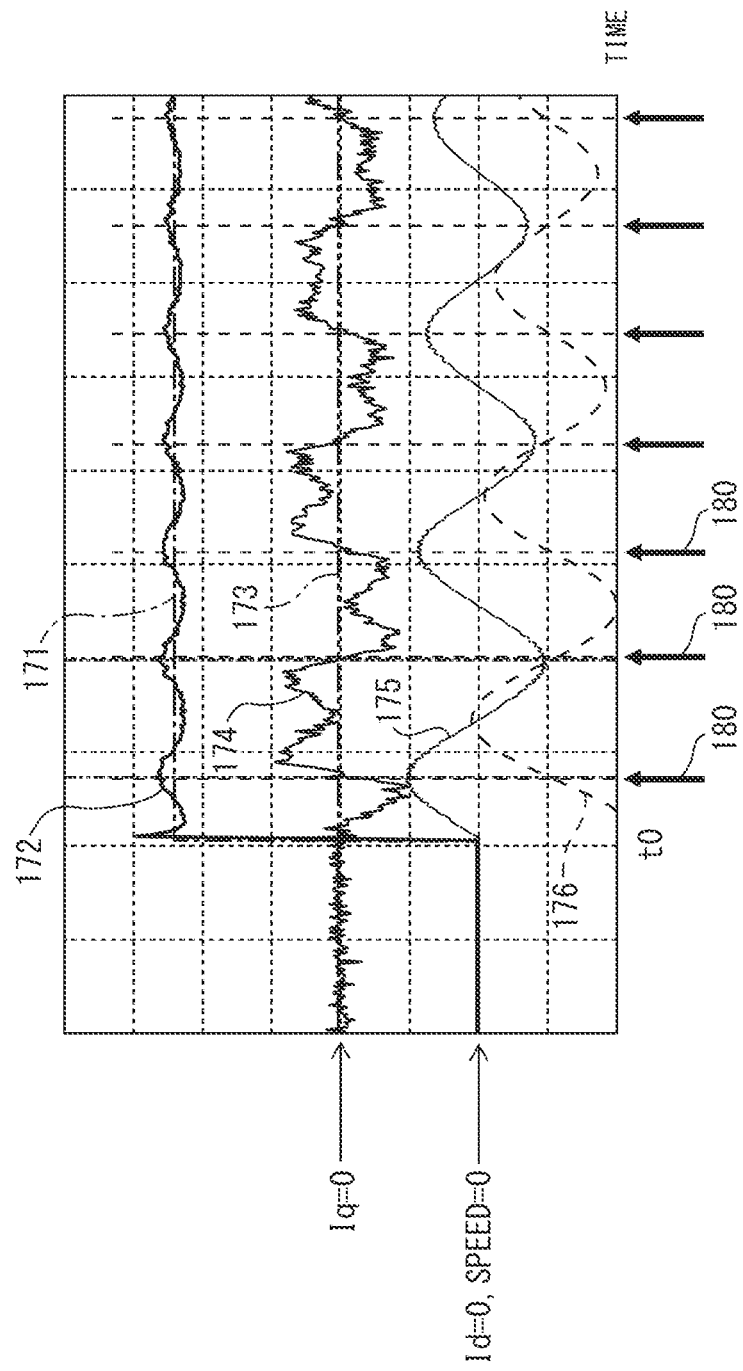
FIG. 7 is a waveform diagram of a Q-phase current, a D-phase current, and the like during direct-current excitation.

FIG. 7 illustrates an example of a time transition of the Q-phase current ($I_q$), the D-phase current ($I_d$), a rotor actual position, and a rotor actual speed when a D-phase current command ($I_d$ command) is a constant value and a Q-phase current command ($I_q$ command) is zero. In FIG. 7, a graph provided with a reference sign 171 represents the $I_d$ command, a graph provided with a reference sign 172 represents the D-phase current ($I_d$), a graph provided with a reference sign 173 represents the $I_q$ command, a graph provided with a reference sign 174 represents the Q-phase current ($I_q$), a graph provided with a reference sign 175 represents the rotor actual speed, and a graph of a broken line provided with a reference sign 176 represents the rotor actual position.

As illustrated in FIG. 7, direct-current excitation in which $I_d$=a constant value and $I_q$=0 starts at a time to. Accordingly, the rotor indicates behavior of being attracted to an excitation phase position and oscillating as described above, and the rotor speed (reference sign 175) and the rotor actual position (reference sign 176) change in an oscillating manner as illustrated in FIG. 7. Further, the current control unit 33 performs an operation of generating a voltage command, based on the direct-current excitation command and the current feedback ($I_d$, $I_q$), and thus $I_d$ current data (the reference sign 172) and $I_q$ current data (the reference sign 173) change as in FIG. 7. An arrow provided with a reference sign 180 in FIG. 7 (only partially provided with the reference sign) represents a point in time at which a torque is zero-crossed (a point in time corresponding to zero torque). From FIG. 7, it can be understood that a point in time at which the $I_q$ current data are zero-crossed (a point in time at which the actual speed has an extreme value) corresponds to zero torque. However, as described above, in the present embodiment, in order to avoid false detection, a point in time corresponding to zero torque is detected by using an integrated value of the $I_q$ current.

Figure 8:
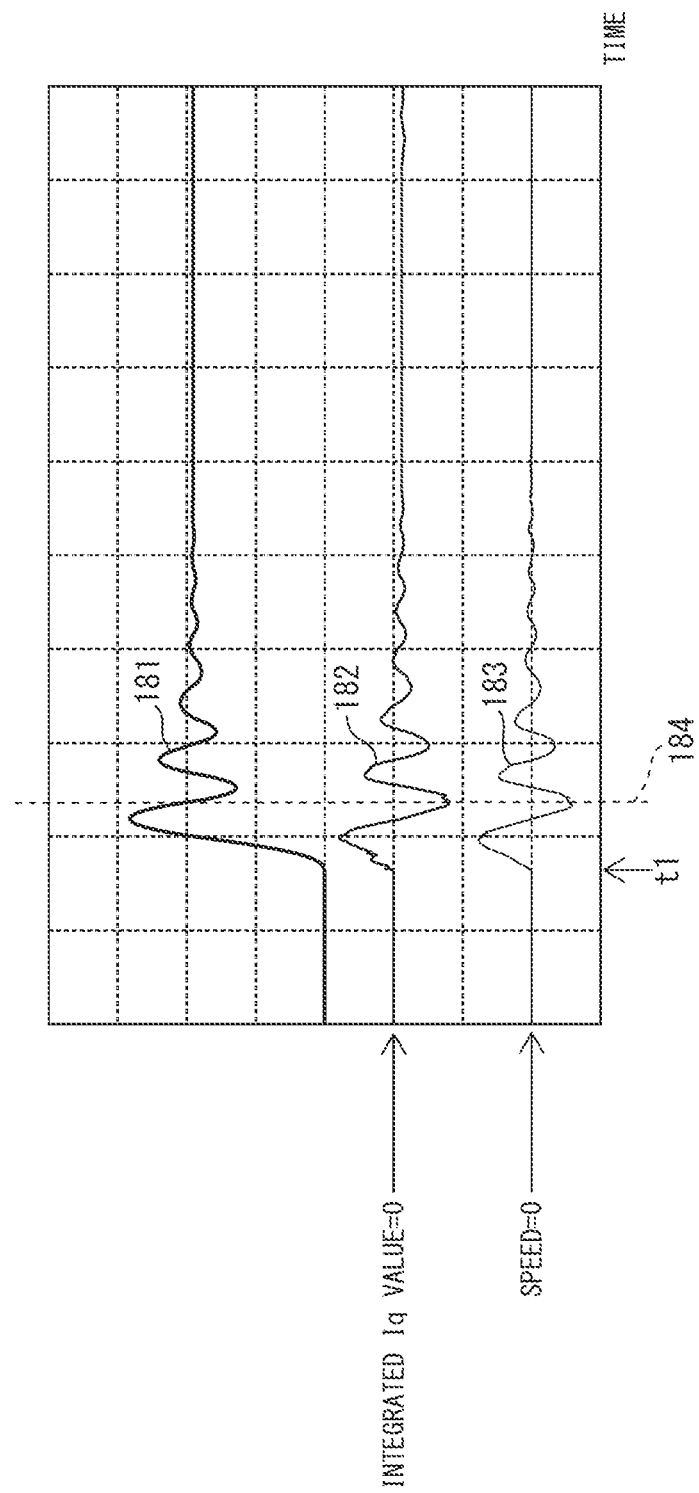
FIG. 8 is a waveform diagram of a rotor actual position, an integrated Q-phase current value, and a rotor actual speed during the direct-current excitation.

FIG. 8 is a diagram illustrating a time transition of a rotor actual position, an integrated Q-phase current value, and a rotor actual speed during execution of direct-current excitation. A graph 181 in FIG. 8 indicates the rotor actual position, a graph 182 indicates the integrated Q-phase current value, and a graph 183 indicates the rotor actual speed. When the direct-current excitation starts at a time t1, the rotor starts an operation of starting to be attracted to a phase position of an excitation phase and oscillating. The oscillation attenuates. It can be understood that the graph 182 indicating the integrated Q-phase current value at this time is substantially the same as the graph 183 indicating the rotor actual speed. Therefore, the integrated Q-phase current value can be used as data indicating a speed of the rotor. Note that, in FIG. 8, one of points in time at which the integrated Q-phase current value (rotor speed) has an extreme value and corresponds to zero torque is indicated by a broken line provided with a reference sign 184.

(A2) The function of detecting a phase of a torque corresponding to zero by using a D-phase current.

Next, a technique for detecting a point in time corresponding to zero torque by using a D-phase current will be described. A voltage equation of a D-phase is expressed by an equation (8) below.

[Math 8]

$$V_{dc} = RI_{dc} - \omega L I_{qc} - \omega \Phi \sin \theta \quad (8)$$

Since the Q-phase current $I_{qc}$ is controlled to be substantially zero in direct-current excitation, the D-phase current is considered to be expressed by an equation (9) below.

[Math 9]

$$I_{dc} \doteq \frac{V_{dc} + \omega \Phi \sin \theta}{R} \quad (9)$$

Herein, it is clear from the torque equation of the equation (3) that an acceleration also similarly changes by $-\sin \theta$, and thus a speed $\omega$ acquired by integrating the acceleration changes in a cosine wave (cos) shape. Thus, when it is assumed that $\omega = A \cos \theta$, the equation (9) can be rewritten into the following equation (10).

[Math 10]

$$I_{dc} \doteq \frac{V_{dc} + A\Phi \cos\theta \sin\theta}{R} \quad (10)$$
$$= \frac{V_{dc} + A\Phi/2 \sin 2\theta}{R}$$

In the equation (10), $V_{dc}$ in a numerator is a component generated by current control, and a second term is an interference component with the d-axis generated by a deviation of a magnetic pole. Thus, in order to keep $I_{dc}$ to be constant, a voltage command for setting a voltage to be 0 for interference and a voltage command acquired by adding a voltage $R^*I_e$ for a resistance are generated in a control voltage. However, the voltage command for suppressing the interference has a slight time delay with respect to the voltage for the interference. When a phase lag by the time delay is α, the D-phase current is considered to be expressed as in an equation (11) below.

[Math 11]

$$I_{dc} \doteq \frac{RI_e - A\Phi/2 \sin(2\theta - \alpha) + A\Phi/2 \sin 2\theta}{R} = \quad (11)$$
$$I_e - \frac{A\Phi/2(\sin 2\theta \cos \alpha - \cos 2\theta \sin \alpha) - A\Phi/2 \sin 2\theta}{R}$$

Herein, α≈0, and thus cos α=1 and sin α=α, and an equation of the D-phase current is expressed by an equation (12) below.

[Math 12]

$$I_{dc} \doteq I_e - \frac{A\Phi/2(\sin 2\theta - \alpha \cos 2\theta) - A\Phi/2 \sin 2\theta}{R} \quad (12)$$
$$= I_e + \left(\frac{\alpha A \Phi}{2R}\right) \cos 2\theta$$

A torque is 0 when θ=0, and cos 2θ is maximum at this time, and thus the D-phase current $I_{dc}$ is also maximum. Thus, when the D-phase current being maximum (local maximum) can be detected, zero torque is detected.

The graph 172 representing a D-phase current waveform is included in FIG. 7. From a positional relationship in FIG. 7 between waveform data (the reference sign 172) of the D-phase current and a point in time of the arrow of the reference sign 180 being a point in time corresponding to zero torque, it can also be understood that a point in time at which the D-phase current is maximum (local maximum) and a position of the zero torque coincide with each other. Therefore, the zero torque correspondence detection unit 42 can detect the point in time corresponding to the zero torque by detecting the point in time at which the D-phase current is maximum (local maximum).

(A3) The function of detecting a phase of a torque corresponding to zero by using a D-phase voltage command.

A voltage equation of a D-phase is expressed by the equation (8) described above, but, even under direct-current excitation, current control functions and the control is performed in such a way that $I_{qc}=0$ and $I_{dc}=I_e$, and thus a D-phase voltage is considered to be expressed as in an equation (13) below.

[Math 13]

$$V_{dc} \doteq RI_{dc} - \omega \Phi \sin \theta = RI_e - \omega \Phi \sin \theta \quad (13)$$

By subjecting the D-phase voltage expressed by the equation (13) to a high-pass filter, the D-phase voltage after the filter is expressed as in an equation (14) below.

[Math 14]

$$HPF(V_{dc}) \doteq -\omega \Phi \sin \theta \quad (14)$$

Herein, in consideration of a fluctuation in the speed ω, a speed is zero in a position in which a magnetic pole position is farthest from an excitation phase, and the speed is maximum or minimum (negatively maximum) when the magnetic pole position matches the excitation phase (θ=0), and thus the speed changes in a cosine wave (cos θ) shape. Thus, after passing through the high-pass filter, HPF(V$_{dc}$) changes in −sin (2θ) shape. Thus, a zero-cross occurs at θ=−90 degrees, θ degrees, 90 degrees, and 180 degrees, i.e., at every 90 degrees, but a place being zero torque is a point where a speed is local maximum or local minimum, and the point is 0 degrees and 180 degrees, and thus corresponds to a place where HPF(V$_{dc}$) changes from positive to negative.

Figure 9:
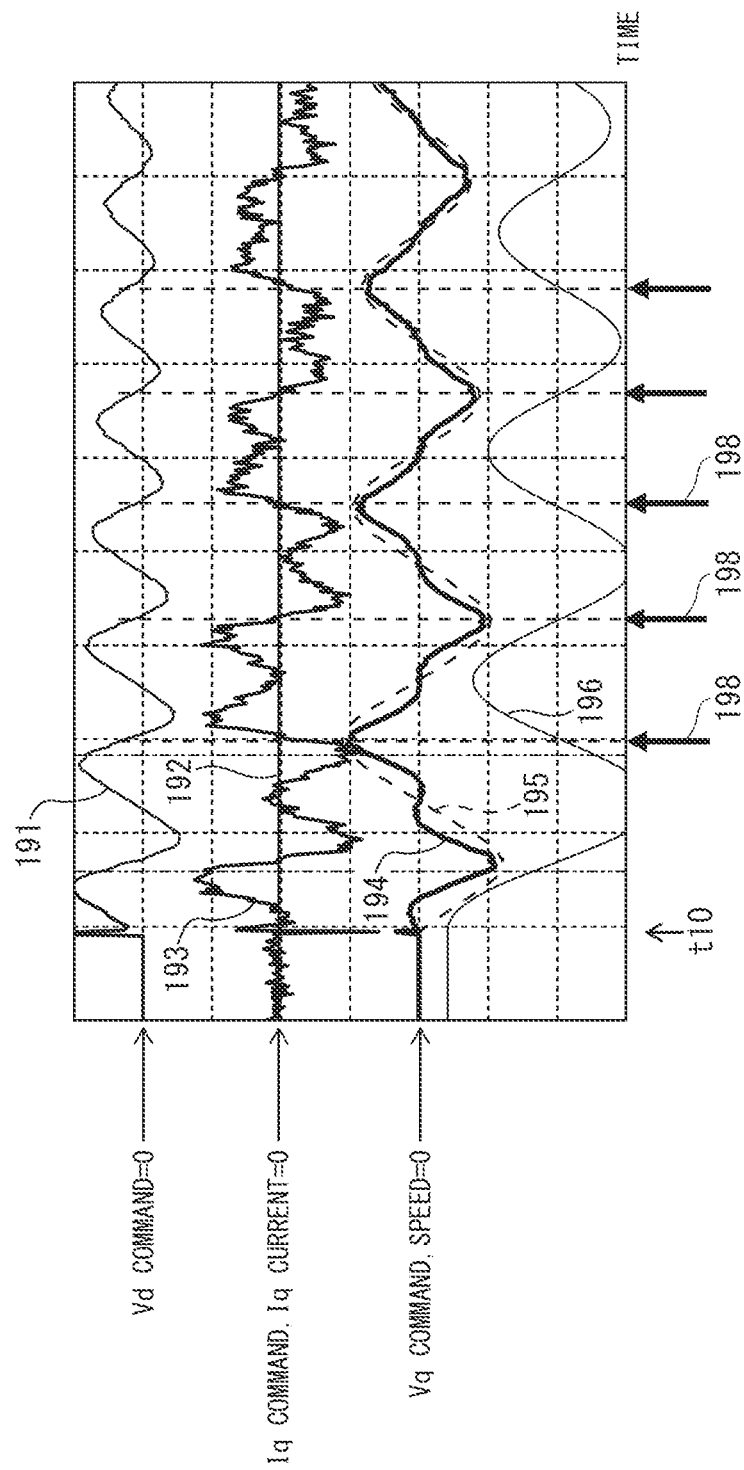
FIG. 9 is a waveform diagram of a D-phase voltage, a Q-phase voltage, and the like during the direct-current excitation.

FIG. 9 is a graph illustrating an example of a time transition of each piece of data about a D-phase voltage command, a Q-phase current, a Q-phase current command, a Q-phase voltage command, and the like during direct-current excitation. A graph of a reference sign 191 is a graph representing the D-phase voltage command (hereinafter, also described as a V$_d$ command 191), a graph of a reference sign 192 is a graph indicating the Q-phase current command (hereinafter, also described as an I$_q$ command 192), a graph of a reference sign 193 is a graph indicating the Q-phase current (hereinafter, also described as I$_q$ 193), and a reference sign 194 is a graph indicating the Q-phase voltage command (hereinafter, also described as a V$_q$ command 194). Furthermore, a graph 195 indicating a rotor actual speed and a graph 196 indicating a rotor actual position are included in FIG. 9. An arrow provided with a reference sign 198 in FIG. 9 (only partially provided with the reference sign) represents a point in time at which a torque is zero-crossed (a point in time corresponding to zero torque).

As illustrated in FIG. 9, with a start of direct-current excitation at a time t10, the rotor actual speed and the rotor actual position fluctuate in an oscillating manner as illustrated in the graph 195 and the graph 196, respectively. At this time, the Q-phase current fluctuates as illustrated in the graph 193, and the D-phase voltage command and the Q-phase voltage command fluctuate as illustrated in the graph 191 and the graph 194, respectively. The graph 191 of the D-phase voltage command is associated with the equation (13) described above.

Figure 10:
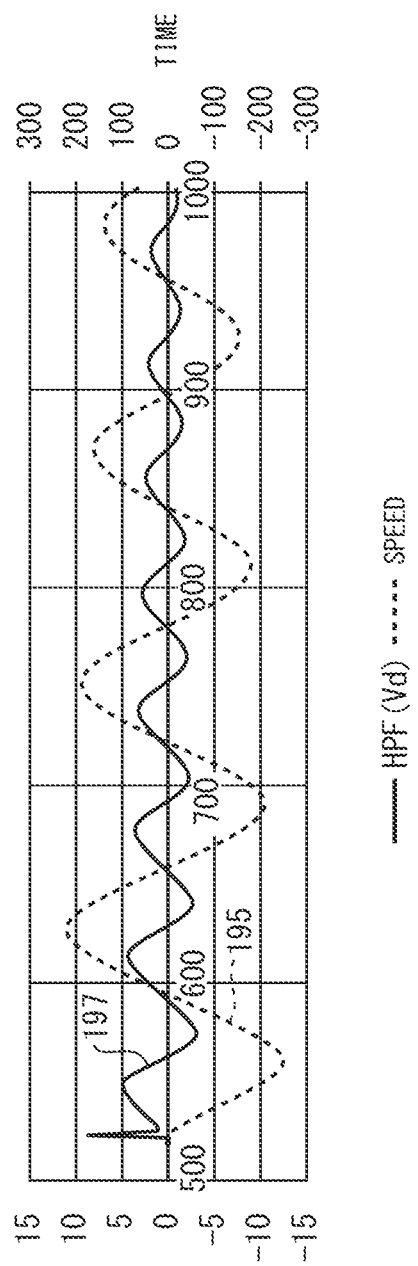
FIG. 10 is a waveform diagram of the D-phase voltage after high-pass filter processing.

FIG. 10 illustrates a graph 197 (hereinafter, also described as HPF(V$_d$) 197) representing a waveform after the V$_d$ command 191 illustrated in FIG. 9 is subjected to a high-pass filter, and also illustrates the graph 195 of the actual speed again. The graph 197 is associated with the equation (14) described above. It can be understood from FIG. 10 that a point in time at which HPF(V$_d$) 197 is zero-crossed (from positive to negative) coincides with a peak of the actual speed, i.e., the point in time coincides with zero torque.

(A4) The function of detecting a phase of a torque corresponding to zero by using a Q-phase voltage command.

From a voltage equation of a Q-phase, a Q-phase current is considered to flow as expressed by the following equation (15).

[Math 15]

$$I_{qc} = \frac{V_{qc} - \omega L I_{dc} - \omega \Phi \cos\theta}{R} \quad (15)$$

Even under direct-current excitation, current control functions, and the control is performed in such a way that I$_{qc}$=0 and I$_{ds}$=I$_e$, and thus the Q-phase voltage command is considered to be expressed as in an equation (16) below.

[Math 16]

$$V_{qc} \fallingdotseq \omega(LI_e + \Phi \cos\theta) \quad (16)$$

In the equation (16) described above, a value in parentheses is maximum when θ=0, and ω is maximum or minimum (negatively maximum) at this time. Thus, detection of the Q-phase voltage command being local maximum or local minimum corresponds to detection of zero torque.

The graph 194 representing a waveform of the Q-phase voltage command is also included in FIG. 9. It can be understood from the graph 194 of the V$_q$ command in FIG. 9 that an extreme value (a local maximum value, a local minimum value) of the V$_q$ command coincides with the arrow 198 at the point in time corresponding to the zero torque. However, in order to prevent false detection of the V$_q$ command near zero, the extreme value may be detected on a condition that an absolute value of the V$_q$ command exceeds a predetermined threshold value.

Figure 11:
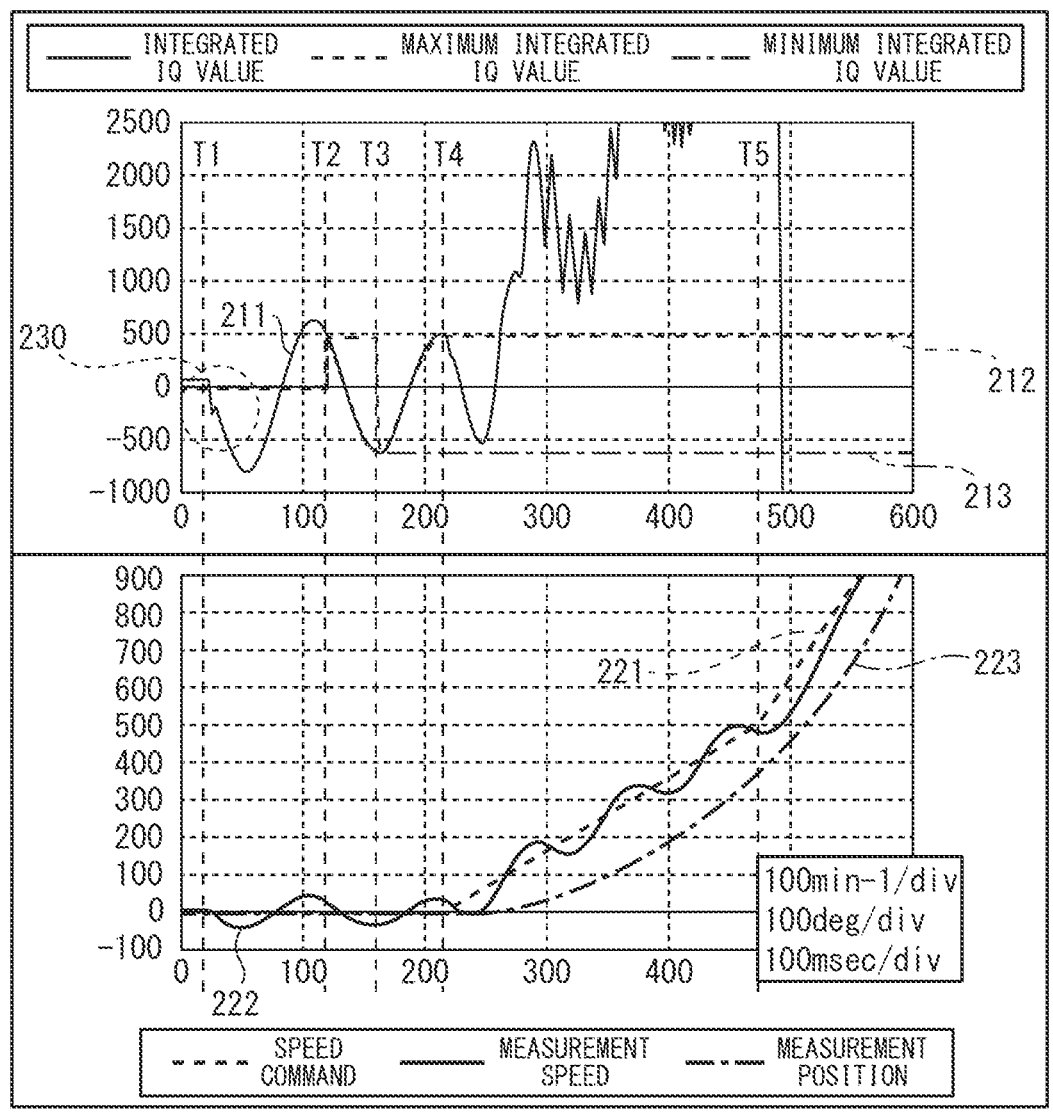
FIG. 11 is a waveform diagram illustrating an operation example when correspondence with zero torque is detected by using the integrated Q-phase current value.

Next, an operation example when a magnetic pole initial position is detected by direct-current excitation using the function of detecting a point in time corresponding to zero torque described above will be described with reference to FIG. 11. Herein, an operation example when correspondence with zero torque is detected by using the integrated Q-phase current value (an integrated I$_q$ value) will be described. FIG. 11 is a diagram illustrating an example of a time transition of various data waveforms when the magnetic pole initial position detection is performed by using the integrated Q-phase current value. In each of the data waveform diagrams on an upper row side in FIG. 11, a graph 211 represents the integrated I$_q$ value (SUMIQA), a graph 212 represents a value of an internal variable (MAXSMQ) indicating a local maximum value of the integrated I$_q$ value, and a graph 213 represents a value of an internal variable (MINSMQ) indicating a local minimum value of the integrated I$_q$ value. Further, in the waveform diagram of each piece of data on a lower row side in FIG. 11, a graph 221 represents a speed command, a graph 222 represents a measurement speed of the rotor, and a graph 223 represents a measurement position of the rotor.

In FIG. 11, when a speed command is input at a point in time T1, the magnetic pole position estimation unit 40 of the motor control device 100 performs a magnetic pole initial position detection operation by direct-current excitation before the speed command is reflected. First, the motor control device 100 initializes the variable SUMIQA indicating the integrated I$_q$ value to 0, and also starts causing an excitation current of the direct-current excitation to flow. In this way, the rotor of the motor starts an oscillating movement, but detection is put on hold until a point in time T2 in such a way that false detection of an extreme value due to an influence in a transient time as a waveform of a portion indicated by a circle (reference sign 230) of a broken line in FIG. 11 is not performed. In other words, for a stable operation, the motor control device 100 puts detection of an extreme value of the integrated I$_q$ value on hold for a predetermined period after the direct-current excitation starts.

At the point in time T2 when a detection holding period ends, MAXSMQ and MINSMQ are initialized by SUMIQA and detection starts. As an exemplification, a series of operations of detecting an extreme value and updating a variable are performed in a predetermined cycle. Since SUMIQA changes at a next update timing of the variables, SUMIQA is compared with previous MAXSMQ and MINSMQ, and MAXSMQ and MINSMQ are updated as follows.

(Operation a) When SUMIQA≥MAXSMQ, an integrated Iq value is increasing, and thus a local maximum value is detected as MAXSMQ=SUMIQA.

(Operation b) When SUMIQA≤MINSMQ, an integrated Iq value is decreasing, and thus a local minimum value is detected as MINSMQ=SUMIQA.

Furthermore, after the next update timing, processing is performed as follows in a case of (Operation a) and a case of (Operation b) in the operation described above.

(Operation c): In the case of (Operation a) in the operation described above, when SUMIQA≥MAXSMQ, detection (detection of a local maximum value) continues as MAXSMQ=SUMIQA. On the other hand, when SUMIQA≤MAXSMQ, SUMIQA is reversed (SUMIQA is a local maximum value) and is regarded as being zero torque, and a magnetic pole position is regarded as matching an excitation phase.

(Operation d): In the case of (Operation b) in the operation described above, when SUMIQA≤MINSMQ, detection (detection of a local minimum value) continues as MINSMQ=SUMIQA. On the other hand, when SUMIQA>MINSMQ, MINIQA is reversed (a local minimum value of SUMIQA is detected) and is regarded as being zero torque, and a magnetic pole position is regarded as matching an excitation phase.

In the operation example in FIG. 11, a local minimum value can be detected at a point in time T3, and thus zero torque is regarded as being detected at this point in time, and a magnetic pole position can also be detected. However, in the present example, an extreme value of the integrated $I_q$ value is assumed to be detected in a direction (polarity) of a speed command. In other words, MAXSMQ is initialized to SUMIQA at the point in time T3 and detection of a local maximum value is prepared. SUMIQA≥MAXSMQ from the point in time T3 to T4, and thus MAXSMQ is updated to SUMIQA, SUMIQA<MAXSMQ is detected at the point in time T4, a magnetic pole position is regarded as matching an excitation phase, and detection is completed. As in the present example, by matching the polarity of the speed command and the polarity of the extreme value detection of the integrated Iq value, a direct-current excitation operation (magnetic pole initial position detection operation) and a normal speed control operation (sensorless control) can be smoothly linked with each other.

After the magnetic pole initial position detection is completed, a speed command put on hold is read, and accelerating in response to the speed command starts.

Note that, as in the present example, a period from the point in time T4 to T5 may be set to be a preparation period for starting sensorless control, and the sensorless control may start after voltage data increase to some extent. In a case of a method using the voltage data in the sensorless control, in order to overcome a low speed region with low voltage resolution, in the present example, a magnetic pole is rotated in response to a command speed. When a predetermined switching speed is reached at the point in time T5, the sensorless control starts.

A way of thinking of providing the detection holding period, the algorithm that detects an extreme value, a way of thinking of providing the preparation period before the sensorless control starts, and the like in the magnetic pole initial position detection operation described with reference to FIG. 11 can also be applied to a case where a D-phase current is used, a case where a D-phase voltage command is used, and a case where a Q-phase voltage command is used in order to detect zero torque.

When the D-phase current is used, after the point in time T2 at which the detection holding period illustrated in FIG. 11 is completed, a local maximum value of the D-phase current is detected by an algorithm similar to that described above. When the local maximum value of the D-phase current is detected, correspondence with zero torque is detected, and a magnetic pole position is initialized.

Hereinafter, the operation shifts to a normal operation of applying a speed command by an operation similar to that after the point in time T4 described above.

When the D-phase voltage command is used, an operation of detecting a zero-cross from positive to negative of the D-phase voltage command $HPF(V_{dc})$ after passing through the high-pass filter is performed after the point in time T2 at which the detection holding period illustrated in FIG. 11 is completed. The zero-cross from positive to negative of $HPF(V_{dc})$ can be detected by taking a reverse of a polarity of $HPF(V_{dc})$ when $HPF(V_{dc})$ is decreasing. When the zero-cross from positive to negative of $HPF(V_{dc})$ is detected, a point in time corresponding to zero torque is assumed to be detected, and a magnetic pole position is initialized. Hereinafter, the operation shifts to a normal operation of applying a speed command by an operation similar to that after the point in time T4 described above.

When the Q-phase voltage command is used, an operation of detecting the Q-phase voltage command being local maximum or local minimum is performed after the point in time T2 at which the detection holding period illustrated in FIG. 11 is completed. The detection of the Q-phase voltage command being local maximum or local minimum can be performed by a technique similar to the detection of the integrated Iq value being local maximum or local minimum. When the Q-phase voltage command being local maximum or local minimum is detected, correspondence with zero torque is assumed to be detected, and a magnetic pole position is initialized. Hereinafter, the operation shifts to a normal operation of applying a speed command by an operation similar to that after the point in time T4 described above.

Figure 12:
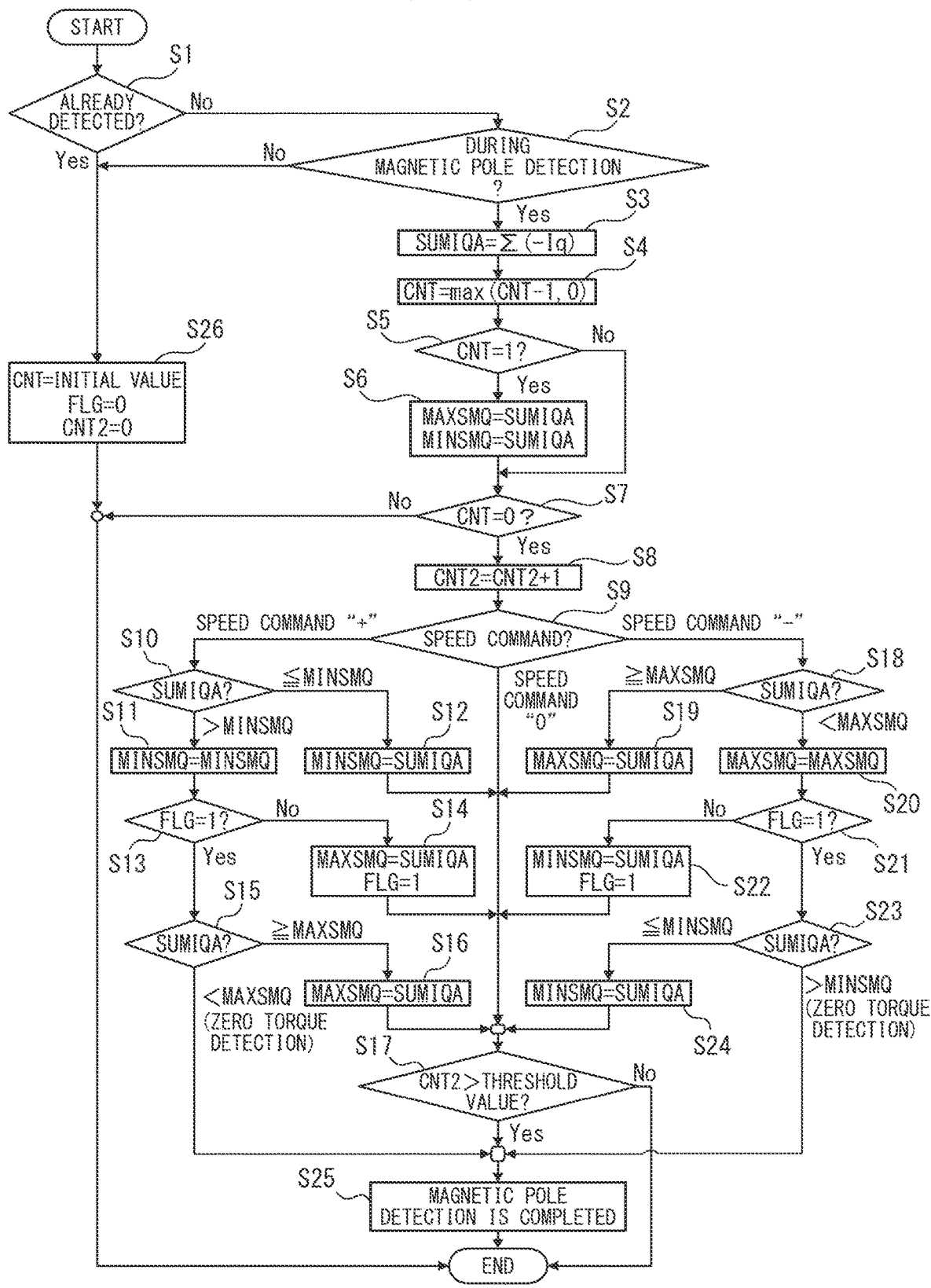
FIG. 12 is a flowchart illustrating magnetic pole initial position detection processing.

FIG. 12 is a flowchart for achieving the magnetic pole initial position detection processing described above with reference to FIG. 11. For example, the present processing is activated with an input of a speed command, and the present processing is periodically performed in a predetermined cycle until magnetic pole initial position detection is completed. The present processing is performed under control by the CPU of the microcontroller 3. First, whether a magnetic pole initial position has already been detected is judged (step S1). The judge may be performed by, for example, judging whether the magnetic pole initial position has already been stored in a storage unit (not illustrated) in the magnetic pole position estimation unit 40. When the magnetic pole initial position is not detected (S1: NO), whether a magnetic pole detection operation is being performed is judged in step S2. Note that, herein, various variables (CNT, FLG, and CNT2) used for control of a program are assumed to be initialized. Note that, when it is judged that the magnetic pole initial position has already been detected in step S1 and when it is judged that the magnetic pole detection is not performed in step S2, various variables are initialized in step S26, and the present processing is exited.

A series of processing from steps S2 to S7 is associated with an operation of waiting detection from the time T1 to T2 in FIG. 11. In this case, it is judged that the magnetic pole detection is performed (S2: YES), and the processing proceeds to step S3. In step S3, the integrated value of the Q-phase current ($\Sigma(-I_q)$) is acquired and stored in the variable SUMIQA. Next, a maximum value of CNT−1 and 0 is acquired by a function max(CNT−1, 0) and is stored in the variable CNT (step S4). This corresponds to processing of decrementing the variable CNT. When the variable CNT is 1 (when the variable CNT is counted down to 1) (S5: YES), the variable MAXSMQ in which a maximum value of the integrated Q-phase current is stored and the variable MINSMQ in which a minimum value of the integrated Q-phase current is stored are each initialized by the integrated Q-phase current value SUMIQA at the present point in time (step S6). Herein, CNT=1, and thus a NO judge is performed in next step S7, and the present processing is once exited.

In a next cycle, when the processing proceeds to the processing from step S2, CNT is decremented in step S4, and, subsequent to step S5: NO, a Yes judge is performed in step S7. In this way, a loop for waiting the detection is exited, and the processing proceeds to a detection operation.

In step S8, the variable CNT 2 is incremented. Next, in step S9, a polarity of a speed command is judged. As illustrated in FIG. 11, when a direction of the speed command is on a positive side, the processing proceeds to step S10. When a direction of the speed command is on a negative side, the processing proceeds to step S18. Note that, when the speed command is zero, the processing proceeds to step S17, and, when CNT2 does not exceed a threshold value, the present processing is exited.

When the speed command is in a positive direction, SUMIQA and MINSMQ are compared with each other in step S10. A case of SUMIQA MINSMQ is a situation where the integrated Q-phase current value is decreasing when the speed command is positive. In this case, MINSMQ is updated to an integrated Q-phase current value SUMIQA in step S12, a NO judge is performed in step S17, and the present processing is once exited. While the integrated Q-phase current value continues to decrease, a judge of SUMIQA MINSMQ in step S10 and an update of MINSMQ=SUMIQA in step S12 continue.

Then, when the integrated Q-phase current value turns to increase, SUMIQA>MINSMQ is judged in step S10, and, after MINSMQ is updated to a present value in step S11, whether the flag variable FLG=1 is judged in step S13. Herein, FLG=1 is not yet set (S13: NO), and thus the processing proceeds to step S14. In step S14, the variable MAXSMQ is updated to a present integrated Q-phase current value. Next, in step S17, it is judged that the variable CNT2 is equal to or less than a threshold value (S17: NO), and the present processing is once exited.

When the processing proceeds to the processing from step S10 while the integrated Q-phase current value continues to increase, YES is judged in step S13, and processing of updating the variable MAXSMQ by the integrated Q-phase current value by the processing from step S15 to step S16 is continuously performed. Then, when the integrated Q-phase current value reaches a local maximum value and starts to decrease, SUMIQA<MAXSMQ is judged in step S15, and a magnetic pole position matches an excitation phase and the magnetic pole detection is completed in step S25.

By a series of the processing from S10 to S16 and S25 described above, when the speed command is positive, a local maximum value generated first is detected without detecting a local minimum value, and the magnetic pole detection can be completed. In other words, the magnetic pole detection operation described above with reference to FIG. 11 is achieved.

A series of processing from step S18 to step S24 is the processing of detecting a point in time of a local minimum value of the integrated Iq value corresponding to zero torque when the speed command is in a negative direction. When it is judged that the speed command is negative (S9: speed command "−"), a state of a value of SUMIQA is confirmed in step S18. When it is judged that SUMIQA≥MAXSMQ, i.e., SUMIQA is increasing, the processing proceeds to step S19, and MAXSMA is updated by a present SUMIQA (MAXSMA=SUMIQA).

On the other hand, when it is judged in step S18 that SUMIQA<MAXSMA, i.e., SUMIQA is decreasing, MAXSMQ is updated by a present value in step S20, and whether the flag FLG is 1 is then judged in step S21. Herein, FLG is an initial value 0, and thus the processing proceeds to step S22. In step S22, MINSMQ is updated to a value of a present SUMIQA (MINSMQ=SUMIQA), and 1 is set to the flag FLG.

In this way, when it is judged that the flag FLG=1 in step S21 through steps S18 and S20 while SUMIQA is decreasing, the processing proceeds to step S23. In step S23, a state of SUMIQA is confirmed. When it is judged that SUMIQA is further decreasing (S23: SUMIQA MINSMQ), SUMIQA is further decreasing, and thus MINSMQ is updated by a present SUMIQA (MINSMQ=SUMIQA) (step S24). Then, herein, it is judged that CNT2 is equal to or less than a threshold value in step S17 (S17: NO), and the present processing is once exited. On the other hand, when it is judged that SUMIQA>MINSMQ in step S23, a local minimum value (peak) of SUMIQA is detected. In this case, the processing proceeds to step S25, and a state where a magnetic pole position matches an excitation phase is acquired and the magnetic pole detection is completed.

Note that, when a state where it is judged in step S10 that SUMIQA MINSMQ and the processing of step S12 is performed and a state where it is judged in step S15 that SUMIQA MAXSMQ and the processing of step S16 is performed continuously, and a YES judge is performed in step S17 (or when a state where it is judged in step S18 that SUMIQA MAXSMQ and the processing of step S19 is performed and a state where it is judged in step S23 that SUMIQA MINSMQ and the processing of step S24 is performed continuously, and the YES judge is performed in step S17), the magnetic pole detection may be completed in step S25.

When an actual magnetic pole position is near an excitation phase of direct-current excitation at a time of a start of magnetic pole detection processing, a Q-phase current hardly flows, and correspondence with zero torque may not be able to be detected. However, in this case, the actual magnetic pole position can be regarded as being near the excitation phase and being in the excitation phase. Thus, in a control unit (the microcontroller 3) of the motor control device 100, at the time of the start of the magnetic pole detection processing, when a state where an amplitude of the Q-phase current is equal to or less than a predetermined threshold value continues for a predetermined time or longer, the actual magnetic pole position may be regarded as being near the excitation phase and the magnetic pole detection (initialization of the magnetic pole position) may be completed. Note that such a state may be detected as a situation where the yes judge is performed in step S17 in the processing in FIG. 12.

As described above, according to the present embodiment, a motor control device that performs sensorless control without including a position detection sensor in a motor can also detect a point in time corresponding to zero torque, and can perform detection of a magnetic pole initial value by a direct-current excitation method in a short time.

While the present invention has been described above by using the typical embodiments, it may be understood by a person skilled in the art that changes, and various other changes, omissions, and additions can be made to each of the aforementioned embodiments without departing from the scope of the present invention.

The configuration of the motor control device described in FIGS. 1 and 6 in the aforementioned embodiments is an exemplification, and various functions described in the aforementioned embodiments may be applied to various motor control devices in which sensorless control is performed by using the dq-coordinate system.

The configuration of the magnetic pole position estimation unit illustrated in FIG. 6 is an exemplification, and the detection function of a magnetic pole initial position by direct-current excitation described in the present embodiment described above can be applied to various types of motor control devices in which a magnetic pole initial position is detected before speed control starts and the magnetic pole initial position is applied to normal sensorless control.

A program that performs various types of processing such as the magnetic pole initial position detection processing (FIG. 12) in the embodiments described above can be recorded in various computer-readable recording media (for example, a semiconductor memory such as a ROM, an EEPROM, and a flash memory, a magnetic recording medium, and an optical disk such as a CD-ROM and a DVD-ROM) that can be read by a computer.

2 Synchronous motor

REFERENCE SIGNS LIST

3 Microcontroller
31 Speed control unit
32 Current command generation unit
33 Current control unit
34 dq-three-phase conversion unit
35 Power conversion unit
36 Three-phase dq-conversion unit
37 Speed calculation unit
40 Magnetic pole position estimation unit
41 Direct-current excitation command generation unit
42 Zero torque correspondence detection unit
42a Current/voltage data processing unit
43 Magnetic pole position update unit
43a Magnetic pole position counter
44 Sensorless control computing unit
100 Synchronous motor control device

The invention claimed is:

1. A synchronous motor control device that performs drive control by sensorless control on a synchronous motor, the synchronous motor control device comprising:
a direct-current excitation command generation unit configured to generate a command for causing a constant excitation current with a fixed current phase to flow through the synchronous motor;
a zero torque correspondence detection unit configured to detect a point in time at which a torque generated in a rotor of the synchronous motor corresponds to zero, based on data about voltage or current control on the synchronous motor when the excitation current based on the command flows through the synchronous motor; and
a magnetic pole position update unit configured to initialize a magnetic pole position at the detected point in time at which the torque corresponds to zero, based on the fixed current phase.

2. The synchronous motor control device according to claim 1, wherein the zero torque correspondence detection unit detects the point in time at which the torque corresponds to zero by detecting an extreme value of an integrated Q-phase current value.

3. The synchronous motor control device according to claim 1, wherein the zero torque correspondence detection unit detects the point in time at which the torque corresponds to zero by detecting a local maximum value of a D-phase current.

4. The synchronous motor control device according to claim 1, wherein the zero torque correspondence detection unit detects the point in time at which the torque corresponds to zero by detecting a zero-cross of a D-phase voltage command.

5. The synchronous motor control device according to claim 1, wherein the zero torque correspondence detection unit detects the point in time at which the torque corresponds to zero by detecting an extreme value of a Q-phase voltage command.

6. The synchronous motor control device according to claim 1, wherein, after a lapse of a predetermined time since a start of a command for causing the constant excitation current to flow through the synchronous motor, the zero torque correspondence detection unit starts detection of the point in time at which the torque corresponds to zero, based on the data about the voltage or current control.

7. The synchronous motor control device according to claim 1, wherein, when a speed command is input, initialization of the magnetic pole position is performed by the direct-current excitation command generation unit, the zero torque correspondence detection unit, and the magnetic pole position update unit, and, when initialization of the magnetic pole position is completed, the sensorless control starts.

8. The synchronous motor control device according to claim 1, wherein, when a state where a Q-phase current amplitude is equal to or less than a predetermined threshold value continues for a predetermined time or longer, an actual phase of the rotor is regarded as stopping near the fixed current phase, and initialization of the magnetic pole position is completed.

* * * * *